（12）United States Patent
Brombach et al.

(10) Patent No.: US 10,903,648 B2
(45) Date of Patent: Jan. 26, 2021

(54) WIND PARK WITH MULTIPLE WIND TURBINES

(71) Applicant: Wobben Properties GmbH, Aurich (DE)

(72) Inventors: Johannes Brombach, Berlin (DE); Christian Strafiel, Aurich (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 16/496,033

(22) PCT Filed: Mar. 23, 2018

(86) PCT No.: PCT/EP2018/057403
§ 371 (c)(1),
(2) Date: Sep. 20, 2019

(87) PCT Pub. No.: WO2018/172506
PCT Pub. Date: Sep. 27, 2018

(65) Prior Publication Data
US 2020/0059102 A1    Feb. 20, 2020

(30) Foreign Application Priority Data

Mar. 24, 2017 (DE) .................... 10 2017 106 436

(51) Int. Cl.
*H02M 3/335* (2006.01)
*H02J 1/10* (2006.01)
*H02J 5/00* (2016.01)

(52) U.S. Cl.
CPC ....... *H02J 1/102* (2013.01); *F05B 2220/7064* (2013.01); *H02J 5/00* (2013.01);
(Continued)

(58) Field of Classification Search
CPC .......... H02M 3/33553; H02M 3/33569; H02J 1/102; H02J 5/00; H02J 2300/28;
(Continued)

(56) References Cited

U.S. PATENT DOCUMENTS 6,069,806 A    5/2000 Lenz et al.
6,437,996 B1   8/2002 Wobben
(Continued)

FOREIGN PATENT DOCUMENTS

CN    101340185 A    1/2009
CN    101630850 A    1/2010
(Continued)

*Primary Examiner* — Thienvu V Tran
*Assistant Examiner* — Sisay G Tiku
(74) *Attorney, Agent, or Firm* — Seed IP Law Group LLP (57) ABSTRACT

A wind park for feeding power into a supply network at a connection point is provided. The wind park includes wind turbines for generating the power, a DC network for transmitting the power to the connection point, an inverter configured to transform electrical DC voltage into an AC voltage for feeding the power into the supply network, at least one DC-DC converter for feeding the power into the DC network. The DC-DC converter includes a switching device and a transformer with primary and secondary sides. The primary side is coupled to the at least one wind turbine via the switching device and the secondary side is coupled to the DC park network via at least one rectifier. The DC-DC converter is configured to apply a DC voltage of changing polarity to the primary side by the switching device to transform a DC voltage of the at least one wind turbine.

21 Claims, 4 Drawing Sheets

(52) U.S. Cl.
CPC ....... *H02J 2300/28* (2020.01); *H02J 2310/18* (2020.01); *H02M 3/33569* (2013.01)

(58) Field of Classification Search
CPC ....... H02J 2310/18; H02H 7/26; H02H 7/268; H02H 7/22
See application file for complete search history.

(56) References Cited

U.S. PATENT DOCUMENTS

| | | | |
|---|---|---|---|
| 7,324,359 B2 | 1/2008 | Schreiber | |
| 8,674,665 B2 | 3/2014 | Sheng et al. | |
| 8,860,236 B2* | 10/2014 | Nasiri | F03D 7/0272 |
| | | | 290/44 |
| 9,214,819 B2 | 12/2015 | Butzmann et al. | |
| 9,300,132 B2* | 3/2016 | Pan | H02J 3/381 |
| 10,374,431 B2* | 8/2019 | Canales | H02J 1/102 |
| 10,566,799 B2* | 2/2020 | Beekmann | H02J 3/38 |
| 2006/0097519 A1* | 5/2006 | Steinke | F03D 9/257 |
| | | | 290/44 |
| 2007/0029802 A1* | 2/2007 | Moehlenkamp | F03D 9/11 |
| | | | 290/44 |
| 2007/0246943 A1 | 10/2007 | Chang et al. | |
| 2010/0156189 A1* | 6/2010 | Fishman | H02J 3/36 |
| | | | 307/77 |
| 2011/0137481 A1* | 6/2011 | Manz | H02J 3/32 |
| | | | 700/291 |
| 2011/0198847 A1 | 8/2011 | Hopewell | |
| 2012/0025535 A1* | 2/2012 | Sihler | H02J 1/04 |
| | | | 290/55 |
| 2012/0080955 A1* | 4/2012 | Fishman | H02J 3/383 |
| | | | 307/82 |
| 2012/0267955 A1* | 10/2012 | Zhan | H02J 1/06 |
| | | | 307/31 |
| 2012/0281441 A1* | 11/2012 | Liu | H02M 7/48 |
| | | | 363/35 |
| 2013/0197704 A1* | 8/2013 | Pan | H02J 3/386 |
| | | | 700/287 |
| 2015/0042092 A1* | 2/2015 | Nelson | H02M 5/45 |
| | | | 290/44 |
| 2015/0148974 A1 | 5/2015 | Diedrichs | |
| 2015/0280629 A1 | 10/2015 | Diedrichs et al. | |
| 2016/0372926 A1* | 12/2016 | Pahlevaninezhad | H02J 3/381 |
| 2017/0009744 A1* | 1/2017 | Brogan | G05F 1/455 |
| 2018/0119674 A1* | 5/2018 | Kjær | F03D 9/25 |
| 2019/0036343 A1* | 1/2019 | Nelson | H02J 3/12 |
| 2019/0386571 A1* | 12/2019 | Dincan | H02M 1/08 |
| 2020/0014317 A1* | 1/2020 | Hillebrandt | H02P 13/06 |

FOREIGN PATENT DOCUMENTS

| | | |
|---|---|---|
| CN | 103066580 A | 4/2013 |
| DE | 19711017 A1 | 10/1998 |
| DE | 19845903 A1 | 4/2000 |
| DE | 102004001478 A1 | 8/2005 |
| DE | 102009028973 A1 | 3/2011 |
| DE | 102012002292 A1 | 11/2012 |
| DE | 102012106517 A1 | 1/2014 |
| EP | 3109992 A1 | 12/2016 |
| JP | 2017011964 A | 1/2017 |
| RU | 2605085 C2 | 12/2016 |
| RU | 2608955 C2 | 1/2017 |
| WO | 2010/049027 A1 | 5/2010 |
| WO | 2016009047 A1 | 1/2016 |

\* cited by examiner

WIND PARK WITH MULTIPLE WIND TURBINES

BACKGROUND

Technical Field

The present invention relates to a wind park having a plurality of wind turbines for feeding electrical power into an electrical supply network at a network connection point. The present invention also relates to a wind park having a DC-voltage-based wind park network. Furthermore, the invention also relates to a wind turbine which is configured to be used in such a DC-voltage-based wind park network.

Description of the Related Art

It is generally known that conventional wind park networks, which are also referred to as park networks for short, are in the form of AC voltage networks having three phases. Such wind parks are often constructed in such a manner that an electrical alternating current is generated in a wind turbine and is transmitted to the AC voltage park network by an electrical converter. There is also the variant which uses a doubly fed asynchronous machine, but the latter also uses a converter.

Active circuit breakers, for example, power semiconductors, are used in the electrical converter and generate a park network voltage with a particular frequency and a particular amplitude. The park network voltage is then usually transformed to a higher voltage level of the supply network via a transformer and therefore makes it possible to feed the power from the park network into the supply network.

In principle, it is desirable to be able to operate a wind turbine in a park network for as long as possible and as reliably as possible. A frequent approach to this is to design as many components of the park network as possible as passive components. Since passive components most commonly in practice have a greater failure safety than active components, the failure safety of the wind park or of the park network is consequently also increased in the case of increased use of passive components in a wind park.

It must also be ensured that the wind turbines within the wind park can be protected from possible damage or destruction by means of suitable protective measures if a fault occurs in the park network, for example, a short circuit or an overcurrent. In this case, it is desirable to be able to achieve at least identical overall reliability of the park network in comparison with AC-voltage-based park networks.

DC park networks for tidal power plants and wind turbines have already been described in the published patent application US 2011/0198847 A1 (Rolls Royce). A so-called flyback converter (or buck-boost converter) is used to transform a DC voltage for a DC park network via a transformer. However, the DC voltage conversion principle described is not suitable for being able to carry out useful DC voltage transmission since the flyback converter principle shown is not suitable for high power transmission.

The German Patent and Trademark Office has searched the following further prior art in the priority application for the present application: DE 198 45 903 A1, US 2013/0197704 A1, DE 10 2004 001 478 A1, DE 10 2009 028 973 A1, DE 10 2012 002 292 A1, DE 197 11 017 A1.

BRIEF SUMMARY

Provided is a solution which, in a simple manner, results in increased safety when operating a wind turbine in a wind park network, in particular in order to combat a potential fault in a park network and therefore to increase the overall reliability of the park network.

Provided is a wind park for feeding electrical power into an electrical supply network at a network connection point. The electrical power generated in the wind park is therefore fed into the electrical supply network via a DC park network.

The wind park therefore has a DC park network for transmitting electrical power from the wind turbines to the network connection point. The electrical power in the park is therefore transmitted as DC voltage or direct current.

In order to feed the power from the DC park network into an electrical supply network which is operated as an AC network, provision is made of a converter which can also be referred to or designed as an inverter or central inverter. For this purpose, this converter is connected to the network connection point, via which the wind park therefore feeds power into the electrical supply network. The converter is therefore arranged between the park network and the network connection point.

A DC-DC converter is provided for transmitting the electrical power from the wind turbine into the DC park network. In particular, at least one DC-DC converter is provided for each wind turbine. In particular, a DC voltage of the wind turbine is therefore transmitted into the DC park network. The DC-DC converter therefore transforms the power with a first DC voltage at the wind turbine into a second DC voltage in the DC park network. The second DC voltage, namely that in the DC park network, is preferably higher in this case than the first DC voltage, that is to say that at the wind turbine.

For this purpose, the DC-DC converter has a switching device and a transformer. The switching device has a plurality of switches, in particular. These switches are connected in such a manner that a voltage of changing polarity is established on the primary side of the transformer. For this purpose, switching is carried out, for example, in such a manner that a positive voltage of the DC voltage of the wind turbine is alternately applied to a first and a second connection of the primary side and the negative voltage of the DC voltage of the wind turbine is applied, in an opposite manner, to the second and first connections of the primary side of the transformer. Accordingly, a current with a constantly changing direction then also flows through the primary side and accordingly generates a current on the secondary side.

As a result, the power is transmitted from the primary side to the secondary side. A rectifying means on the secondary side, in particular accordingly connected diodes, results in rectification and therefore in a direct current and therefore a DC voltage in the DC park network.

This advantageously achieves DC isolation between the wind turbine and the park network. It was also possible to achieve the situation in which the active components of the switching means are present only on the turbine side on the primary side of the transformer, that is to say toward the wind turbine. The solution is particularly efficient in this case because it achieves high energy transmission at the same time by means of positive and negative currents in the transformer.

It is also particularly efficient to carry out the changing polarity with a virtually square-wave voltage change. A high-frequency transformer, in particular, is proposed for this purpose. It has been recognized that the use of a comparatively high-quality transformer nevertheless results in a cost-effective overall solution since positive and negative pulses can be transmitted here, which more than compensates for the use of a high-quality high-frequency transformer.

DC isolation between the wind turbine and the park network is therefore achieved with a transformer. Furthermore, only passive components are used in the DC-voltage-based park network. Active components are used only on the AC side, that is to say on the turbine side in the low-voltage circuit of the wind turbine and on the network side downstream of the central inverter, and are therefore protected from high voltages in the DC park network by the DC isolation. As a result, the failure safety of the park network can also be increased and comparatively cost-effective semiconductor switches, which are designed for a small voltage range, can be used on the turbine side.

The basic principle of DC-DC conversion, which is based on the principle of forward conversion or resonant conversion, is advantageously used here.

In this case, resonant conversion is based on the principle of connecting additional capacitances and inductances in such a manner that the power-transmitting section, including the transformer, forms a resonant circuit and is therefore operated in the region of its so-called resonant point. An exemplary basic circuit for carrying out resonant conversion would be, for example, to introduce an additional inductance and capacitance in series with the primary winding of the transformer.

The practice of carrying out a DC-DC conversion by means of a resonant converter has the advantage that power losses during switching operations can be minimized. In this case, a resonant conversion makes it possible to switch at a zero crossing of the voltage or of the current. This principle can also quite generally be referred to as soft switching.

Furthermore, as a result of the structure of the wind park, a very compact and cost-effective structure can be implemented and a single-stage voltage increase, which can be freely set in a wide range, from the wind turbine to the park network can be implemented. The park network voltage can therefore be readily set using a transmission ratio ü of the transformer.

A DC park network also has only two main connection lines for transmitting the power, namely a connection line for the positive voltage and a connection line for the negative voltage. At least one connection line in comparison with a conventional AC voltage architecture can therefore be saved as a result of the DC park network architecture. The cabling complexity of the wind park can therefore be reduced if a new wind park is constructed.

When operating a DC park network, it is also important to carry out selective network protection using DC short-circuit interruptions. In the event of a fault occurring in the DC park network, the wind turbine must be able to be isolated by means of fast isolating switches during brief network disconnection. In this case, selective network protection means that it is possible to independently react to different faults which can occur at different locations in the park network or in or directly on the turbine by fault disconnection or another protective measure. In this case, the selective network protection is carried out in multiple stages, with the result that the reaction to faults in wind turbines, for example, is different than in the case of a fault which occurs in the park network. Faults which can be coupled from the supply network into the park network should likewise be taken into account. Locally limited disconnections in the case of locally occurring faults also fall under selective network protection, in particular.

It was recognized that it is advantageous, in DC-voltage-based park networks, to use a special DC-DC converter which can ensure suitable power transmission and can enable active turbine protection. As a result of the use of a DC-DC converter principle which is based, for example, on a forward or resonant conversion, not only higher power transmission can be ensured, but it is also possible to completely isolate the transformer from the wind turbine. If all switching means on the turbine side on the primary side of the transformer are opened, the wind turbine is galvanically, or at least electrically, decoupled from the park network.

When operating a wind park, it is also necessary to use a suitable network architecture. A suitable network architecture is distinguished by the fact that, if a fault occurs in the wind park, the entire park network need not be disconnected, but rather it can continue to be operated in sections. For example, the park network may be constructed as a ring network or a mesh network or a combination thereof. If a fault occurs in a section of the park network, use is made of so-called isolating switches which isolate the fault during a brief interruption in the network voltage in order to isolate the section in which a fault occurs from the rest of the park network which does not have a fault. The section in which a fault does not occur can then be operated further and the electrical power which is generated in this section can be fed into the electrical supply network.

The disclosure therefore achieves, at least according to one embodiment, a substantially higher efficiency during power transmission through the use of a suitable switching device with a transformer and proposes a fundamentally new network protection concept for the DC park network.

The wind turbine preferably provides the switching device with a DC voltage at a DC voltage output, which DC voltage can be transformed from the primary side to the secondary side by means of the switching device.

In this case, the DC voltage provided can come from an intermediate circuit of a converter of the wind turbine, for example. In the case of a wind turbine having a synchronous generator for example, a rectifier may be provided for this purpose, which rectifier can provide the DC voltage for the DC-DC converter by rectifying an alternating current generated by the generator.

In this case, the DC voltage provided at the DC voltage output may be described as a low voltage and may have voltage values of less than 1000 volt (V) which are typical of an intermediate circuit.

The switching device preferably comprises at least two circuit breakers and/or at least four circuit breakers which are set up to apply a DC voltage into a voltage of changing polarity to the primary side.

The circuit breakers can therefore be connected as a half-bridge or full-bridge circuit, for example a so-called H-bridge.

Common circuit breakers or power transistors such as IGBTs, thyristors, MOSFETs or bipolar transistors can be used as circuit breakers, for example.

In this case, the circuit breakers are controlled in such a manner that, in a first switch position, a positive voltage of the DC intermediate circuit is applied to a first connection point of the primary winding by means of a first circuit breaker and a negative voltage of the DC intermediate circuit is applied to a second connection point of the primary winding by means of a second circuit breaker, with the result that current flows in a first direction through the primary winding.

In a second switch position, a positive voltage of the DC intermediate circuit is applied to the second connection point of the primary winding by means of the first circuit breaker and a negative voltage of the DC intermediate circuit is applied to the first connection point of the primary winding by means of the second circuit breaker, with the result that current flows in a second direction through the primary winding. A change is then made between these two switch positions, with the result that the current direction accordingly changes continuously.

This can also be achieved by four circuit breakers. The use of at least two or four circuit breakers therefore makes it possible to generate a changing polarity on the primary side of the transformer and to generate a changing current in the primary winding which results in a changing current in the secondary winding. As a result, power or energy is transmitted from the primary side to the secondary side of the transformer.

The transformer of the DC-DC converter is preferably in the form of a high-frequency transformer. The switching sometimes produces high frequency components which can therefore be transmitted. These high frequency components can be produced, in particular, by high switching frequencies and/or steep switching edges. Transmission with few losses is achieved through the use of a high-frequency transformer. Typical high switching frequencies, above which use of a high-frequency transformer starts to be worthwhile on account of the cost efficiency, are in the range of 20 kHz-200 kHz. One embodiment proposes that a high-frequency transformer with switching frequencies from this range is used.

The use of a high-frequency transformer therefore makes it possible to transmit the voltage with a high degree of efficiency with very low losses, in particular. In addition, the use of a high-frequency transformer makes it possible to use circuit breakers having a particularly high switching speed or steep switching edges. For example, modern power transistors such as IGBTs or SiC-MOSFETs have large or steep switching edges of several KV/µs.

Furthermore, considerably higher switching frequencies of the circuit breakers in the switching device can be achieved with a high-frequency transformer in comparison with conventional transformers. Overall, the efficiency when transmitting the DC voltage is improved with the use of a high-frequency transformer.

The transformer of the DC-DC converter is preferably in the form of a step-up transformer in order to transform the lower voltage on the primary side into a higher voltage on the secondary side.

The voltage on the primary side is lower than the voltage on the secondary side or the park network voltage. In this case, the park network voltage corresponds only to the rectified voltage on the secondary side of the transformer.

It is therefore possible to step up the DC voltage provided by the wind turbine at a DC voltage output to a higher voltage range. It is also possible to transform the voltage from the primary side to the secondary side by a predefinable transformation ratio ü.

The transformer of the DC-DC converter is preferably in the form of a DC isolating stage in order to carry out DC isolation between the wind turbine and the DC park network. The transformer is therefore designed in such a manner that a connection from the primary side to the secondary side and vice versa exists only via electromagnetic coupling. There is no DC connection.

The practice of using a DC-isolated transformer as protective isolation increases the safety when operating a wind turbine in the DC park network. In particular, a threat to the wind turbine as a result of an overvoltage in the DC park network can be avoided.

As a result of the DC isolation, no short-circuit currents can be coupled into the low-voltage circuit and it is therefore possible to prevent the entire energy in the park network from being able to be discharged via the transformer. Furthermore, the reliability of the park network is also increased by the passive design of the transformer.

The transformer of the DC-DC converter is preferably in the form of a high-voltage transformer in order to achieve safe DC isolation between the wind turbine and the DC park network for high voltages as well. In this case too, a transmission ratio ü between the primary side and the secondary side of the high-voltage transformer can be substantially freely selected.

A value of at least 5, preferably at least 20, in particular at least 50, is proposed as the transmission ratio ü for the transformer and fundamentally applies to any transformer described above or below. The preferred DC park network voltage during normal operation is in this case at least 6 kV, preferably at least 14 kV, in particular at least 20 kV.

Very generally, the transmission ratio ü of a transformer is described via the ratio $U_{secondary}/U_{primary} = n_{secondary}/n_{primary}$, where $U_{primary}$ and $U_{secondary}$ describe the voltages and $n_{secondary}$ and $n_{primary}$ describe the respective number of windings of the primary side and secondary side.

It is therefore possible to be able to operate the transformer in the case of a large voltage difference between the primary side and secondary side in a high-voltage DC network and to be able to set the voltage ratio in any desired manner.

The DC park network preferably has a voltage for transmitting high power which is greater than 6 kV.

A park network voltage which is greater than 6 kV therefore enables a sufficiently large power flow in order to feed the powers generated by the wind turbines into the electrical supply network. In this case, a voltage which is greater than 14 kV makes it possible to operate the network-side inverter without a transformer since the intermediate circuit voltage is sufficiently large.

The secondary side preferably has at least two rectifying means, wherein the rectifying means are set up to rectify the transformed voltage from the primary side to the secondary side into the DC voltage of the DC park network by means of full-wave rectification.

Very generally, full-wave rectification is understood here as meaning a rectifying arrangement, in particular a diode arrangement, having at least two rectifying means or diodes which are used to rectify both positive and negative voltages. In this case, both negative and positive components of an electrical voltage can be rectified into a unipolar DC voltage.

The voltage of changing polarity, which is transmitted via the transformer, can therefore be rectified into a DC park network voltage.

The full-wave rectification is preferably in the form of a push-pull full-wave rectifier circuit and/or a bridge rectifier circuit.

The rectifying means is preferably in the form of a high-voltage diode.

It is therefore possible to rectify the converted voltage on the secondary side into high voltage classes.

The transformer preferably has a center tap in order to carry out push-pull full-wave rectification.

The advantage of a center tap is that, as a result of the design structure of the circuit, only half of the transmitted voltage is dropped across the neutral point connection point and only two diodes are required in comparison with a full-bridge converter having four diodes.

It has also been recognized that faults can occur at different locations when operating a wind park, for example in the wind turbine, in the park network or other components which are included in the overall system of the wind park. Since the faults very generally cannot be predicted, it is proposed here to provide a multi-stage protective concept in the structure of a park network for safe operation, which concept makes it possible to isolate the wind turbines and the park network from one another and to switch them to have zero potential. It should likewise be ensured that the park network can be isolated from the supply network and can be switched to have zero potential.

One embodiment proposes that the inverter has, on the park network side, a discharging or grounding apparatus for achieving a zero-potential state in the entire DC park network and/or in a section of the DC park network, wherein the discharging or grounding apparatus preferably has a chopper and/or a discharge resistor. In a DC park network in particular, electrical voltage may still be present in the DC park network after disconnection, at least a residual voltage, because capacitors present in the DC park network, for example, still carry a residual voltage. The discharging or grounding apparatus is proposed for removing such a voltage or residual voltage. For example, the residual voltage can be discharged to ground in a pulsed manner by means of the chopper. Electrical connection of the two voltage potentials of the DC park network via a discharge resistor also comes into consideration. The discharge resistor can also be used to discharge the voltage to ground. The discharge resistor can also be used together with the chopper by virtue of the chopper discharging the voltage in a pulsed manner via the discharge resistor.

Provided are suitable protective measures very generally being either circuit breakers which are introduced in the DC park network or a suitable network architecture which can ensure selective network disconnection. The disadvantage of circuit breakers for high DC voltage classes is the large cost factor. The choice of a suitable DC park network architecture in order to be able to achieve reliable network protection is therefore proposed.

In particular, suitable protection can be carried out with the aid of decoupling between the wind turbine and the park network by means of DC isolation in the form of a transformer and suitable DC-DC conversion. This structure makes it possible to decouple the wind turbine from the park network on the low-voltage side.

It is also proposed that the switching means and the isolating switches in the park network are used in such a manner that they enable automatic reclosing or fast isolation of the fault on the basis of the fault location. Automatic reclosing and fast isolation of the fault by means of the isolating switches in the park network are therefore further possible protective measures in order to be able to react to faults in the high-voltage circuit of the park network without having to disconnect the entire wind park.

It is also pointed out that the terms automatic reclosing and isolation are known technical terms from the field of network protection and electrical power technology.

Another configuration provides for at least one electrical load and/or an energy store to be arranged in the park network in order to be able to electrically consume power inside the park network if the supply network and the park network are isolated. If the wind park has to be isolated from the electrical supply network on account of a fault in the supply network or on account of a specification by the network operator, it is therefore still possible to consume power or to feed the power into an energy store provided for this.

This may be advantageous if a fault is present only briefly and the wind turbines do not have to be immediately disconnected on account of missing loads.

It may also be disadvantageous if a multi-stage protective concept or selective network protection is not available. Active isolation of the wind turbine by means of a suitable switching device or automatic reclosing by means of isolating switches in the park network is also not disclosed, in particular, in the published patent application US 2011/0198847 A1. The technology shown therein could also have a particularly high stray inductance on account of the unsuitable transformer, which results in poor efficiency when transmitting power.

Provided is a method for controlling a wind park for feeding electrical power into an electrical supply network at a network connection point, wherein the wind park:
 has at least two wind turbines for generating electrical power;
 has a DC park network for transmitting electrical power from the wind turbines to the network connection point;
 has an inverter arranged between the DC park network and the network connection point, wherein the inverter transforms electrical DC voltage of the DC park network into an AC voltage in order to feed the electrical power of the wind turbines into the electrical supply network; and
 at least one DC-DC converter is provided and feeds electrical power from at least one wind turbine into the DC park network, wherein:
 the DC-DC converter has a switching device and a transformer with a primary side and a secondary side,
 the primary side is coupled to the at least one wind turbine via the switching device,
 the secondary side is coupled to the DC park network via at least one rectifying means, in particular a rectifying means having a plurality of diodes, and
 the DC-DC converter applies a DC voltage of changing polarity to the primary side of the transformer by means of the switching device, wherein a DC voltage of the at least one wind turbine is thereby transformed from the primary side to the secondary side.

This method preferably operates in the manner explained in connection with a wind park described above or below. The method preferably uses such a wind park.

BRIEF DESCRIPTION OF THE SEVERAL VIEWS OF THE DRAWINGS

The present invention is now explained in more detail by way of example below on the basis of exemplary embodiments with reference to the accompanying figures.

DETAILED DESCRIPTION

Figure 1:
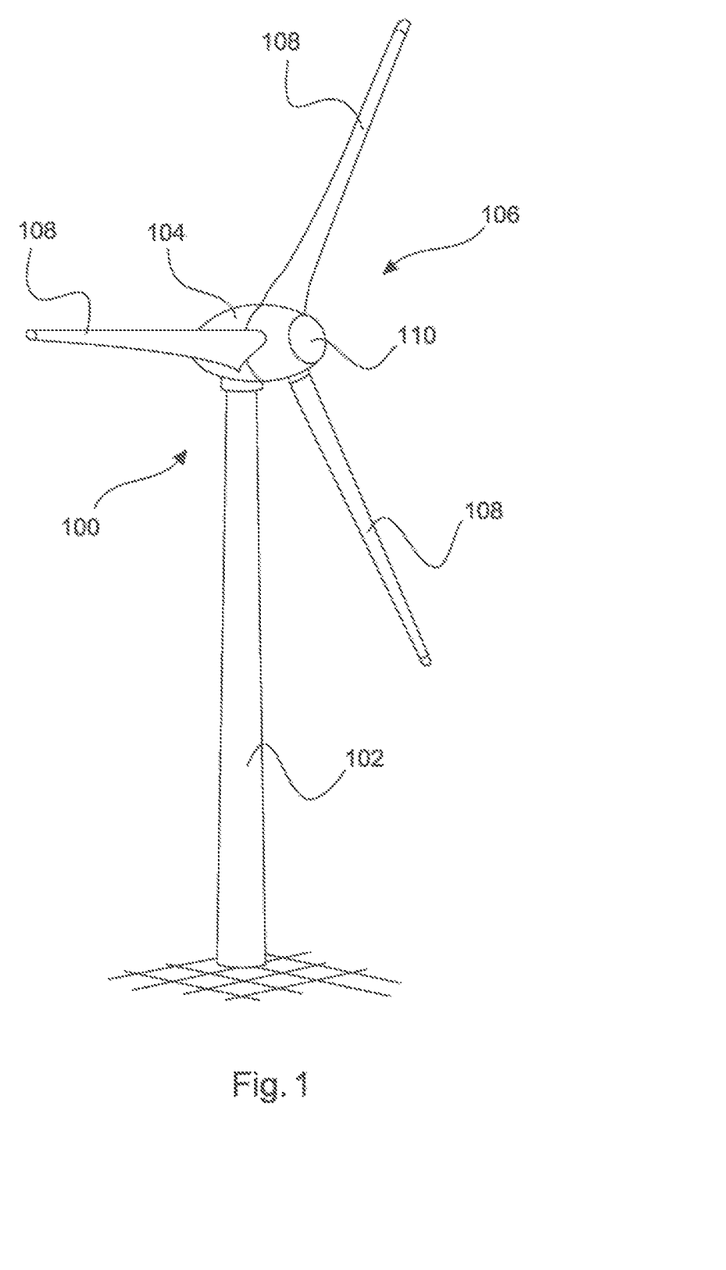
FIG. 1 shows a schematic view of a wind turbine according to one embodiment.

FIG. 1 shows a wind turbine 100 having a tower 102 and a nacelle 104. A rotor 106 having three rotor blades 108 and a spinner 110 is arranged on the nacelle 104. The rotor 106 is caused to rotate during operation by the wind and thereby drives a generator in the nacelle 104.

Figure 2:
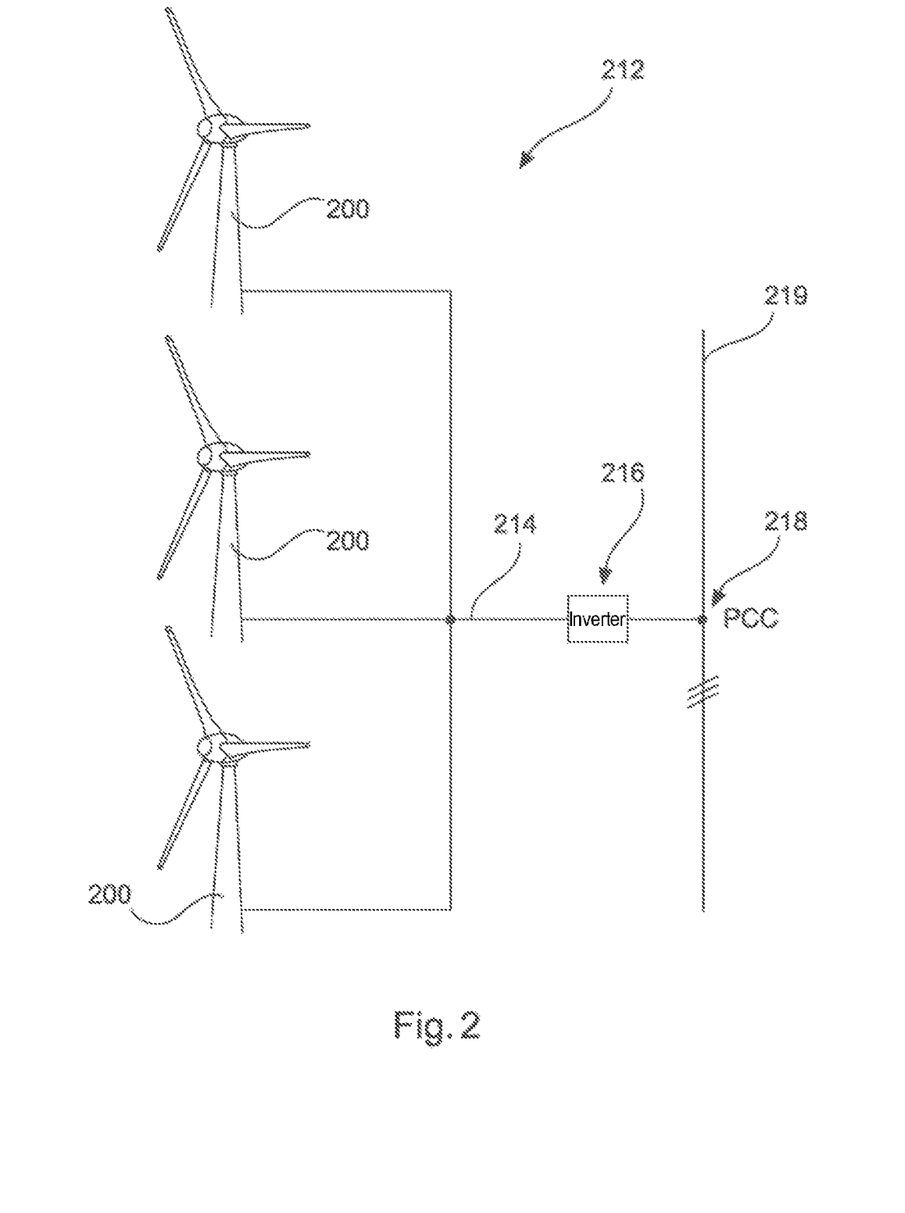
FIG. 2 shows a schematic view of a wind park according to one embodiment.

FIG. 2 shows a wind park 212 having, by way of example, three wind turbines 200 which may be identical or different. The three wind turbines 200 are therefore representative of fundamentally any desired number of wind turbines in a wind park 212.

The wind turbines 200 provide their power, namely the generated current in particular, via an electrical DC park network 214. In this case, the respectively generated currents or powers of the individual wind turbines 200 are added and a central inverter 216 is provided here and converts the DC voltage in the park into an AC voltage in order to then feed corresponding current into the supply network 219 at the feed-in point 218, which is also generally referred to as the PCC. FIG. 2 is only a simplified illustration of a wind park 212 which does not show a controller, for example, even though a controller is naturally present.

Figure 3:
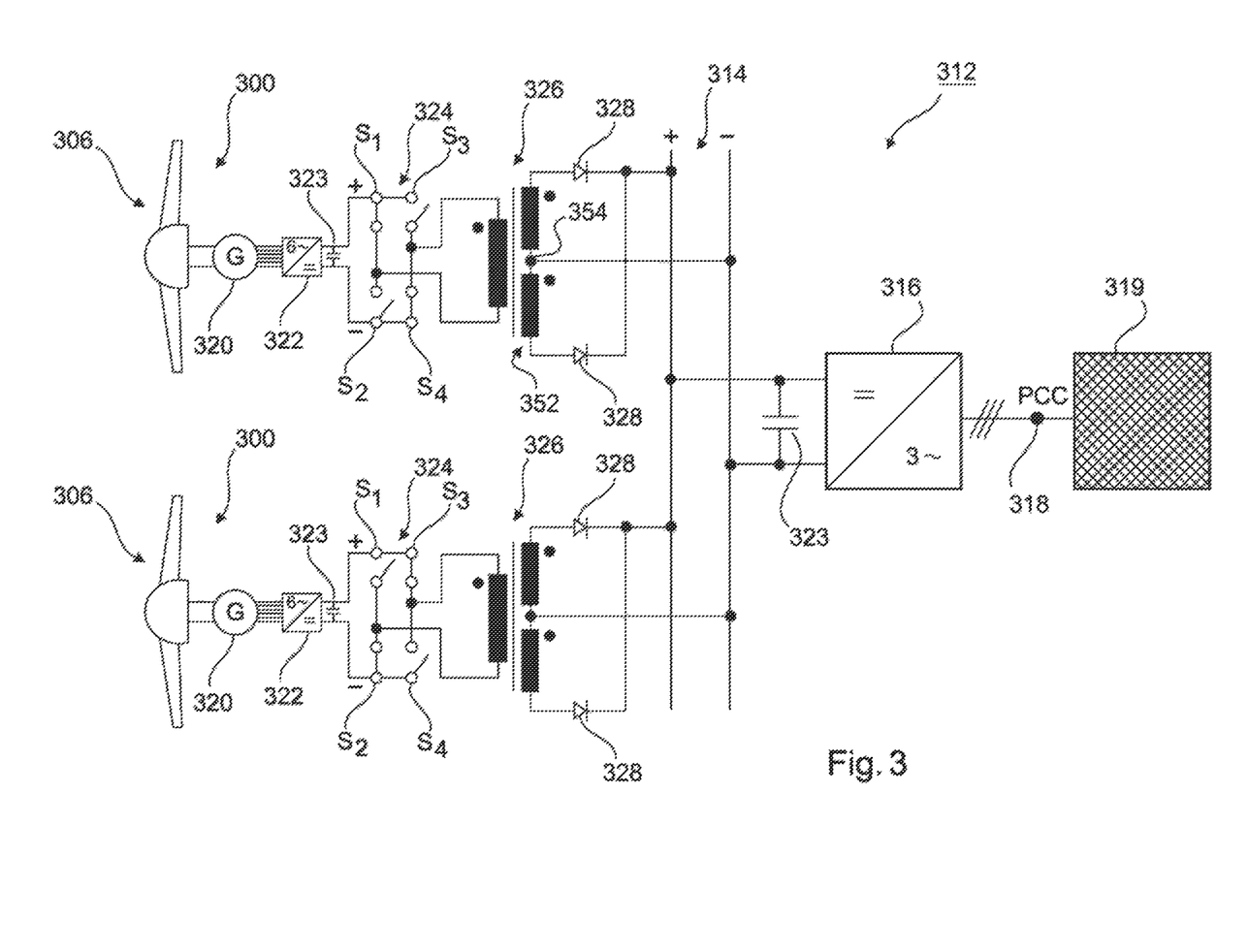
FIG. 3 schematically shows a structure of a wind park according to the invention with a DC park network according to a further embodiment.

FIG. 3 shows a detailed embodiment of the wind park 312. Each wind turbine 300 converts mechanical energy into electrical power using a rotatable rotor 306 by means of a generator 320. In this case, the generator 320 generates a six-phase AC voltage which is rectified into a DC voltage using a rectifier 322. In this case, the rectifier 322 may also have a capacitor 323 as an energy store on the DC-voltage side. The rectifier 322 is electrically connected in this case to the switching device 324, with the result that the rectified DC voltage from the rectifier can be made available to the switching device 324.

In this case, the switching device 324 has a total of four circuit breakers S1, S2, S3 and S4, wherein the four circuit breakers are arranged in a full-bridge circuit which can also be referred to as a bridge circuit or an H-bridge. The switches S1 and S2 which are connected in series form a first bridge arm in this case and the switches S3 and S4 which are likewise connected in series form a second bridge arm. Furthermore, a primary side 350 of the transformer 326 is electrically connected to the two bridge arms of the switching device 324, namely between the switches S1 and S2 with a first connection and between the switches S3 and S4.

A positive voltage can be generated on the primary side 350 of the transformer 326 by diagonally switching on the switches S1 and S4, in which case the switches S2 and S3 are open. Conversely, a voltage with a negative sign can likewise be applied to the primary side 350 of the transformer 326 if the switches S2 and S3 are in a conductive state and the switches S1 and S4 are in a non-conductive state.

In accordance with the polarity of the voltage, the sign of the current flow through the primary side 350 of the transformer 326 also changes. The switching device 324 therefore generates a voltage of changing polarity on the primary side 350 of the transformer 326.

The voltage of changing polarity is transformed to the secondary side 352 of the transformer 326 using a transformation ratio ü. In this case, the transformer 326 has a division with a center tap 354. The center tap 354 allows full-wave rectification via the rectifier 328. In this case, the center tap 354 is electrically connected to a first main connection line of the park network 314 and the rectifier 328 are connected to the second electrical main connection line via a common connection point.

Therefore, the transformed DC voltage on the secondary side 352 of the transformer 326 is rectified into the park network voltage by means of the rectifier 328. A central inverter 316 is electrically connected to the two main connection lines of the park network 314. The central inverter 316—which may likewise have a capacitor 323 as a store—then feeds the generated power from the park network into the electrical three-phase supply network 319 at the network connection point 318.

Figure 4:
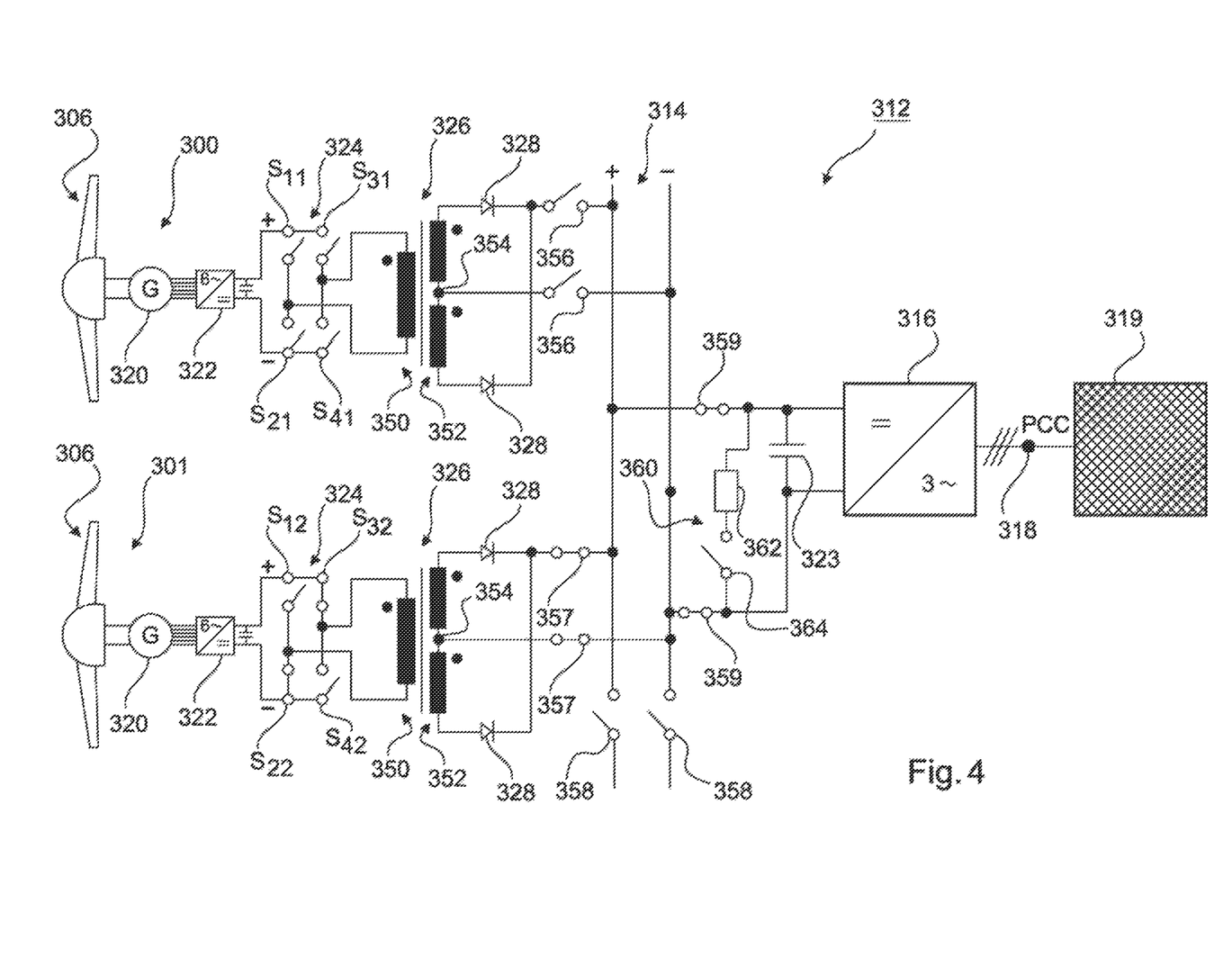
FIG. 4 schematically shows a structure of a wind park with a DC park network, where selective network protection is implemented.

FIG. 4 shows a further detailed embodiment of the wind park 312 and illustrates a multi-stage and selective network protection concept according to one embodiment. For the sake of clarity, similar, but not necessarily identical, elements in FIGS. 3 and 4 have been provided with identical reference signs. In the embodiment shown, the switches S11, S21, S31 and S41 of the switching device 324 are open. With the open switch position, the primary side 350 of the transformer 326 is electrically decoupled from the wind turbine and is therefore isolated.

The secondary side 352 for each wind turbine can likewise be electrically isolated, in particular DC-isolated, from the park network 314 via the isolating switches 356, 357. The embodiment shown in FIG. 4 shows, as an example, how the wind turbine 300 is electrically isolated from the park network 314 and the isolating switches 356 are open, in which case the wind turbine 301 is still connected to the park network via the isolating switches 357. Maintenance work on the wind turbine 300 can therefore be carried out, for example, and the wind turbine 301 can still actively feed power into the supply network 319 at the same time.

Furthermore, the isolating switches 356, 357, 358, 359 may be arranged in any desired manner in the park network 314. If, for example, a fault occurs in another section—no longer shown in FIG. 4—of the wind park 312, another section of the park network can be disconnected via the isolating switches 358 shown.

FIG. 4 likewise shows a grounding apparatus 360, which can also be referred to as a discharging apparatus, which has a load resistor 362 and a further switch 364. The switch 364 can operate as a chopper and can conduct current, by means of pulsing, via the load resistor 362 which therefore operates as a discharge resistor because the intermediate circuit capacitor 323 shown by way of example can be discharged thereby. This grounding apparatus 360 can therefore have a chopper, for example, and additionally or alternatively a discharge resistor or a discharge impedance. The grounding apparatus therefore has the task of being able to discharge the park network 314 and can likewise be used to discharge the intermediate circuit capacitor 323 of the inverter 316. It is therefore possible to switch the park network 314 to have zero potential, which may be important, in particular, for maintenance purposes in order to protect service personnel.

The invention claimed is:

1. A wind park for feeding electrical power into an electrical supply network at a network connection point, comprising:
    at least two wind turbines for generating the electrical power;
    a direct current (DC) park network for transmitting the electrical power from the at least two wind turbines to the network connection point;
    an inverter arranged between the DC park network and the network connection point and configured to transform electrical DC voltage of the DC park network into an alternating current (AC) voltage for feeding the electrical power of the at least two wind turbines into the electrical supply network; and
    at least one DC-DC converter for feeding the electrical power from at least one wind turbine of the at least two wind turbines into the DC park network, wherein:

the at least one DC-DC converter includes a switching device and a transformer with a primary side and a secondary side, the primary side is coupled to the at least one wind turbine via the switching device, the secondary side is coupled to the DC park network via at least one rectifier having a plurality of diodes, and the DC-DC converter is configured to apply a DC voltage of changing polarity to the primary side of the transformer using the switching device thereby transforming a DC voltage of the at least one wind turbine from the primary side to the secondary side, and wherein the transformer of the DC-DC converter is a step-up transformer configured to transform a lower voltage on the primary side into a higher voltage on the secondary side.

2. The wind park as claimed in claim 1, wherein the at least one wind turbine provides the switching device with the DC voltage at a DC voltage output and the DC voltage is generated to be transformed from the primary side to the secondary side using the switching device.

3. The wind park as claimed in claim 1, wherein the switching device includes two circuit breakers or at least four circuit breakers configured to apply the DC voltage as the DC voltage of the changing polarity to the primary side.

4. The wind park as claimed in claim 1, wherein the transformer of the DC-DC converter is a high-frequency transformer configured to produce fewer electrical losses when transforming the DC voltage from the primary side to the secondary side in a case of high switching frequencies or large switching edges.

5. The wind park as claimed in claim 1, wherein the transformer of the DC-DC converter is a DC isolating stage configured to perform DC isolation between the at least one wind turbine and the DC park network.

6. The wind park as claimed in claim 1, wherein the transformer of the DC-DC converter is a high-voltage transformer configured to perform DC isolation between the at least one wind turbine and the DC park network, wherein the high-voltage transformer has a predefined transmission ratio.

7. The wind park as claimed in claim 1, wherein the DC park network has a voltage for transmitting power that is greater than 6 kilovolt (kV).

8. The wind park as claimed in claim 1, wherein the secondary side has at least two rectifiers configured to rectify the transformed DC voltage from the primary side to the secondary side into the DC voltage of the DC park network by full-wave rectifier circuit.

9. The wind park as claimed in claim 8, wherein the full-wave rectifier circuit is a push-pull full-wave rectifier circuit or a bridge rectifier circuit.

10. The wind park as claimed in claim 1, wherein the at least one rectifier includes high-voltage diodes.

11. The wind park as claimed in claim 1, wherein the transformer has a center tap operative to perform push-pull full-wave rectification.

12. The wind park as claimed in claim 1, wherein the transformed DC voltage from the primary side to the secondary side has a substantially square-wave profile.

13. The wind park as claimed in claim 1, wherein the inverter includes, on a DC park network side, a discharging or grounding apparatus for achieving a zero-potential state in the DC park network or in a section of the DC park network, wherein the discharging or grounding apparatus has a chopper or a discharge resistor.

14. The wind park as claimed in claim 1, wherein the DC park network includes at least one isolating switch for isolating a fault in a section of the DC park network, wherein the isolating switches is operative to connect or isolate sections of the DC park network to enable selective DC park network disconnection.

15. The wind park as claimed in claim 1, wherein the DC park network is a ring network or a mesh network.

16. The wind park as claimed in claim 1, wherein the primary side of the transformer is operative to be galvanically decoupled via the switching device, wherein electrical decoupling is performed by opening a switch arranged in the switching device to achieve complete electrical or galvanic decoupling between the at least one wind turbine and the DC park network.

17. The wind park as claimed in claim 1, wherein the DC-DC converter is a forward converter or a resonant converter.

18. The wind park as claimed in claim 1, wherein at least one electrical load or an energy store is arranged in the DC park network to electrically consume power inside the DC park network if the electrical supply network and the DC park network are isolated.

19. The wind park as claimed in claim 1, comprising:
an isolating switch configured to automatically reclose or isolate a fault.

20. A method for controlling a wind park for feeding electrical power into an electrical supply network at a network connection point, comprising:

generating, by at least two wind turbines, the electrical power;

transmitting, by a DC park network, the electrical power from the at least two wind turbines to the network connection point;

transforming, by an inverter arranged between the DC park network and the network connection point, electrical DC voltage of the DC park network into an AC voltage for feeding the electrical power of the at least two wind turbines into the electrical supply network; and feeding, by at least one DC-DC converter, the electrical power from at least one wind turbine of the at least two wind turbines into the DC park network, wherein:

the DC-DC converter has a switching device and a transformer with a primary side and a secondary side, the primary side is coupled to the at least one wind turbine via the switching device, the secondary side is coupled to the DC park network via at least one rectifier having a plurality of diodes, and the DC-DC converter applies a DC voltage of changing polarity to the primary side of the transformer by the switching device, wherein a DC voltage of the at least one wind turbine is transformed from the primary side to the secondary side, and wherein the transformer of the DC-DC converter is a step-up transformer configured to transform a lower voltage on the primary side into a higher voltage on the secondary side.

21. A wind park for feeding electrical power into an electrical supply network at a network connection point, comprising:

at least two wind turbines for generating the electrical power;

a direct current (DC) park network for transmitting the electrical power from the at least two wind turbines to the network connection point;

an inverter arranged between the DC park network and the network connection point and configured to transform electrical DC voltage of the DC park network into an alternating current (AC) voltage for feeding the electrical power of the at least two wind turbines into the electrical supply network; and at least one DC-DC converter for feeding the electrical power from at least one wind turbine of the at least two wind turbines into the DC park network, wherein:

the at least one DC-DC converter includes a switching device and a transformer with a primary side and a secondary side, the primary side is coupled to the at least one wind turbine via the switching device, the secondary side is coupled to the DC park network via at least one rectifier having a plurality of diodes, and the DC-DC converter is configured to apply a DC voltage of changing polarity to the primary side of the transformer using the switching device thereby transforming a DC voltage of the at least one wind turbine from the primary side to the secondary side, and wherein the DC park network includes at least one isolating switch for isolating a fault in a section of the DC park network, wherein isolating switches are operative to connect or isolate sections of the DC park network to enable selective DC park network disconnection.

* * * * *